United States Patent
Adelmann

(10) Patent No.: US 8,596,540 B2
(45) Date of Patent: Dec. 3, 2013

(54) METHOD AND PORTABLE APPARATUS FOR RECOGNIZING BARCODES

(75) Inventor: Robert Adelmann, Zurich (CH)

(73) Assignee: ETH Zurich, Zurich (CH)

( * ) Notice: Subject to any disclaimer, the term of this patent is extended or adjusted under 35 U.S.C. 154(b) by 52 days.

(21) Appl. No.: 13/144,354

(22) PCT Filed: Jan. 11, 2010

(86) PCT No.: PCT/EP2010/000081
§ 371 (c)(1),
(2), (4) Date: Aug. 17, 2011

(87) PCT Pub. No.: WO2010/081664
PCT Pub. Date: Jul. 22, 2010

(65) Prior Publication Data
US 2011/0297748 A1  Dec. 8, 2011

(30) Foreign Application Priority Data
Jan. 15, 2009  (EP) .................................. 09000470

(51) Int. Cl.
*G02B 26/10* (2006.01)
(52) U.S. Cl.
USPC ................................ 235/462.25; 235/462.01
(58) Field of Classification Search
USPC ........................................ 235/462.25, 462.01
See application file for complete search history.

(56) References Cited

U.S. PATENT DOCUMENTS

| | | | | |
|---|---|---|---|---|
| 5,308,966 | A | * | 5/1994 | Danielson et al. ........ 235/462.23 |
| 5,510,604 | A | * | 4/1996 | England .................... 235/462.25 |
| 6,082,619 | A | * | 7/2000 | Ma et al. ..................... 235/462.1 |
| 7,121,469 | B2 | * | 10/2006 | Dorai et al. .................... 235/470 |
| 7,159,780 | B2 | * | 1/2007 | Christian ................. 235/462.25 |
| 7,416,125 | B2 | * | 8/2008 | Wang et al. .............. 235/462.25 |
| 7,606,741 | B2 | * | 10/2009 | King et al. .................... 705/27.2 |
| 2002/0023958 | A1 | * | 2/2002 | He et al. .................... 235/462.01 |
| 2006/0061806 | A1 | * | 3/2006 | King et al. .................... 358/1.15 |
| 2009/0224050 | A1 | * | 9/2009 | Hayakawa et al. ...... 235/462.29 |
| 2010/0187311 | A1 | * | 7/2010 | van der Merwe et al. ........................ 235/462.01 |

FOREIGN PATENT DOCUMENTS

WO  WO 2007038680 A2 *  4/2007

* cited by examiner

*Primary Examiner* — Thien M Le
*Assistant Examiner* — Asifa Habib
(74) *Attorney, Agent, or Firm* — Rankin, Hill & Clark LLP

(57) ABSTRACT

A method for optical recording of a linear barcode pattern and determination of a symbol sequence as defined by the barcode pattern from a blurred raw image and includes the following steps: taking a raw image of the barcode pattern, preprocessing the raw image to generate a series of output patterns, comparing the output pattern with stored reference patterns, wherein the reference patterns correspond to blurred images of sharp nominal patterns and each reference pattern is provided with at least one symbol, determining for each of the output patterns the reference pattern which most closely resembles the output pattern outputting, transmitting or storing the symbols corresponding to the determined reference pattern and following the sequence of output patterns, as a symbol sequence.

13 Claims, 3 Drawing Sheets

METHOD AND PORTABLE APPARATUS FOR RECOGNIZING BARCODES

BACKGROUND OF THE INVENTION

1. Field of the Invention

The invention relates to the field of optical recognition of barcodes. In particular, it relates to a method and to a portable apparatus for the optical detection of a linear barcode pattern and for determining a symbol sequence which is coded by the barcode pattern, according to the preamble of the respective independent patent claims.

2. State of the Art

Methods and apparatus for the optical detection of a linear barcode pattern, in particular those with which the portable apparatus are mobile telephones with cameras, are known. Thereby, as a rule, it is to be assumed that the pictures which are taken by the camera are adequately focussed, for example because the camera has an auto-focussing function. Such methods however fail with cheaper cameras with fix-focus lenses, since the cameras do not provide a focussed picture with an object distance which is necessary for an adequately defined picture of a barcode or line code.

Ideas for processing blurred or indistinct pictures for the recognition of barcodes exist. These are known for example from the following publications:

J. Kim and H. Lee, "Joint nonuniform illumination estimation and deblurring for bar code signals", Opt. Express 15, 14817-14837 (2007)

Ta-Hsin, Ke-Shin Lii, "Deblurring Two-Tone Images by A Joint Estimation Approach Using Higher-Order Statistics", Proceedings of the 1997 IEEE Signal Processing Workshop on Higher-Order Statistics (SPW-HOS '97), page: 108, year of publication: 1997, ISBN: 0-8186-8005-9

S. Esedoglu, "Blind deconvolution of bar code signals" Inverse Probl. 20, 121-135 (2004).

The described methods however are very computation-intensive, so that for example minutes are required for the analysis of a picture. Moreover, the recognition with regard to pictures of a quality, as is provided by a defocused mobile telephone camera, is not reliable or not at all possible.

BRIEF SUMMARY OF THE INVENTION

It is therefore the object of the invention to provide a method and a portable apparatus for the optical detection of a linear barcode pattern and for determining a symbol sequence, which is coded by the barcode pattern, which overcomes the disadvantages mentioned above.

These objects are achieved by a method and a portable apparatus according to the respective independent patent claims.

The method for the optical detection of a linear barcode pattern and for determining a symbol sequence which is coded by a barcode pattern, proceeds from a blurred raw picture and comprises the following steps:

taking a raw picture of the barcode pattern;
pre-processing the raw picture for producing a sequence of output patterns;
comparing the output patterns to stored reference patterns, wherein the reference patterns in each case correspond to blurred images of non-blurred nominal patterns, and at least one symbol is assigned to each reference pattern;
determining for each of the output patterns, in each case that reference pattern which has the greatest similarity to the output patterns;
outputting, transmitting or storing the symbols which correspond to the determined reference patterns, as a symbol sequence, according to the sequence of the output patterns.

Alternatively, instead of a sequence of output patterns, one starts from a single output pattern. This single output pattern represents a complete barcode without the division into individual symbols. The subsequently explained method sections may also be applied to such an output pattern which images a sequence of several symbols corresponding to a complete barcode.

Thus, one proceeds from a picture of a camera which does not automatically focus (or is focussed wrongly), with which the barcode to be recognised lies outside a distance range of focussed imaging. The picture—after a pre-processing—is compared to reference patterns. Each reference pattern corresponds to a blurred image of a nominal pattern which is computed preferably offline and beforehand. A nominal pattern, in turn, corresponds to a code pattern or to a code pattern with at least one neighbouring code pattern. By way of a nominal pattern containing neighbouring code patterns, one may take into account the influence of the neighbouring code pattern which arises with blurred imaging. A code pattern, in turn, is assigned to a symbol of the code. Thereby, also several code patterns may be assigned to the same code.

With the generally known EAN (European Article Number) or related codes such as GTIN (Global Trade Item Number) codes, the code represents a sequence of digits. The digits correspond to the symbols mentioned above and, depending on the context, one or several code patterns of two black bars and two white intermediate spaces are assigned to each digit.

For producing the reference pattern corresponding to the nominal patterns, the blurredness of the camera is modelled and the blurred image is simulated. For example, the blurredness is modelled by way of a point spreading function (PSF), and thus is modelled to an at least approximated impulse response of the camera. This may be determined, for example, in a simple manner experimentally by way of recording a black point on a white background.

The PSF depends on various parameters, in particular on the object distance between the imaged surface and the optics. Preferably therefore, the PSF is determined for several object distances, and several reference patterns corresponding to different object distances are stored for each code. Preferably therefore, several stored reference patterns in each case for different image parameters, in particular for different distances, are present for each of the nominal patterns. On comparing the output patterns with the stored reference patterns, one uses those reference patterns which correspond to an estimate of the actual image parameters, e.g. the distance.

The estimation of the actual object distance is effected preferably also merely on the basis of the raw picture or the output pattern. For example, the steepness (the gradient) of the signals which correspond to the black/white transitions in the barcode indicates a measure of the defocusing and thus also a measure of the object distance. For example, the steepest flank in the output patterns may be searched for and the steepness, via a previously determined and stored assignment function, may be mapped to the distance or directly to an index of a set of corresponding reference patterns.

Alternatively, one may also use other methods for estimating the distance, which start from the detected pictures, such methods being known for example for auto-focussing cameras.

Code patterns lying next to one another mutually influence one another due to the blurredness of the image. Preferably therefore, in each case an individual reference pattern is produced for different combinations of two or more code patterns lying next to one another. For example, ten separate reference patterns corresponding to the symbol pairs "03", "13", . . . up to "93" are produced and stored for the digit or the symbol "3" (in a certain coding). If, apart from the preceding symbol, one also takes into account the subsequent symbol, then 100 separate reference patterns "030", "130", "230 . . . 031", "131", "231", . . . "739", "839", "939", . . . are produced. In other words, the nominal patterns are composed, in each case, from a code pattern corresponding to a first symbol (reference symbol) and from at least one neighbouring code pattern corresponding to a second symbol or to a second and to a third symbol (neighbouring symbols). Thus the reference patterns produced from the nominal patterns are assigned in each case to a pair or a triple of symbols.

One may store the complete reference pattern corresponding to the two or three symbols or one may store only the part of the reference pattern which is of interest, which corresponds to the symbol of interest (the symbol "3" in the above example). A part of the information on the neighbouring symbol(s), due to the blurred imaging, gets into the edge regions of this part of the reference pattern which is of interest.

The reference patterns are preferably computed beforehand offline outside a mobile apparatus and then, together with the assigned symbols, transmitted to a mobile apparatus and used there for pattern comparison. Preferably, information on the symbol sequences which are permissible a certain context, is likewise transmitted, be it as a list of symbol sequences or as a specification of a value range. For example, in a retail shop, it is known which product codes are to be expected, so that it is only these which are transmitted. The recognition may be accelerated with this and the reliability further improved.

Thus, the reference patterns are assigned in each case to a reference symbol and to at least one neighbouring symbol. With a comparison of a sequence of output patterns (corresponding to a symbol sequence) to the reference patterns, then preferably not only a correct assignment of an output pattern to a reference pattern and thus also to a reference symbol is required, but also that the neighbouring symbol agrees with the reference symbol corresponding to the respective neighbouring output pattern. Vice versa, if the neighbouring symbol is known, the search for the reference symbol may be limited and accelerated by way of this. Put generally, thus a multidimensional optimisation problem is present, with which, with the recognised reference patterns, the assigned symbol pairs or symbol triples must be consistent with those of neighbouring reference patterns. Various optimisation methods may be applied to this problem.

In a preferred embodiment of the invention, the sequence of output patterns is worked off sequentially during recognition. Thereby, the reference patterns of corresponding symbol combinations are preferably used. If, for example, the symbol "4" has been recognised as the last one, then for the recognition of the next symbol, one starts from reference patterns corresponding to the symbol pairs "40", "41", "42", . . . up to "49" or to the symbol triples "400", "401", "402", . . . up to "499", i.e. these reference patterns are firstly or exclusively compared to the current output patterns. The search space is limited by way of this and the speed and quality of recognition is accelerated.

The step of the pre-processing comprises at least the step: producing a total output pattern according to a brightness course along the barcode pattern, thus in the direction perpendicular to the direction of the individual bars of the barcode, and the division of the total output pattern into the sequence of output patterns.

For example, the total output pattern may be produced by generating the brightness course along the barcode pattern by way of the selection of a picture line of the—optionally rotated—raw picture or by way of averaging over several picture lines (image lines).

In another preferred embodiment of the invention, in the pre-processing, the brightness course along the barcode pattern is produced by way of carrying out a Hough transformation on the raw picture or a section of the raw picture, by which means a brightness distribution arises in an imaging plane spanned by angle and distance (Hough-space) arises. The brightness course is extracted according to the sequence of values on that straight line in the imaging plane which leads through the maxima in the imaging plane and corresponds to a constant angle in the raw picture. By way of this use of the Hough transformation, on the one hand the brightness course is determined independently of the orientation of the barcode, and on the other hand an averaging of parallel brightness courses is carried out automatically over the complete height of the bars of the barcode.

In a preferred embodiment of the invention, the steps from recording the raw picture up to the determining the recognised symbols are repeated several times, until a predefined number of results agree with one another. This is effected preferably with a picture recording frequency or video frequency of the camera, for example with 15 or 30 pictures/second.

The method according to the invention preferably takes place in sales areas. With this, a customer with his suitably prepared mobile apparatus, typically a mobile telephone with camera, may read barcodes on products and/or display stands. One may realise a variety of information services by way of this identification of products. These may be of a general nature or be adapted individually to the user, and may be provided by the sales organisation or also by third parties. Information with regard to the product, apart from the price and quantity, may for example be allergy information, price comparisons with similar offers, information on fair-trade organisations, on certification organisations and on consumer organisations. In another preferred application of the invention, the product is detected as being selected by the user. The selected products are transferred to the sales dealings directly or at the checkout, for example via a local wireless connection such as Bluetooth or WLAN, and the payment is effected based on this.

Thus as a basis for the described application, in a preferred embodiment of the invention, the symbol sequences to be recognised and corresponding reference patterns are transmitted to the mobile apparatus in a wireless manner at a sales location, optionally also further information on the individual products. With this, the recognition may be limited to the actually present product codes, which indeed encompass only a small number of the basically possible maximal number of, for example EAN codes. The maximal number is for example 1000 to 100000 codes. The method variant, in which the barcode as a complete, individual output pattern without subdivision into several output patterns is recognised, may be advantageously applied in such a case. Only the reference pattern corresponding to all actually present product codes, as the case may be, also in a multiple manner for different imaging parameters, needs to be generated and transferred to the mobile apparatus.

One may basically use known methods for comparing the output patterns and reference patterns. In another, preferred embodiment of the invention, the comparison is made by way of comparing the first derivatives of the two patterns to one another, in particular by way of the difference of the values of the first derivatives being formed and summed. The thus computed sum is a measure for the similarity of the two patterns. In a preferred variant of this method, additionally the signs of the derivative in the region of the edges of the pattern are compared. Different signs reduce the measure for the similarity of the patterns. Additionally, the differences of the absolute values of the patterns may also be summed. With all variants, furthermore, the patterns may be compared to one another several times, and thereby may in each time be shifted with respect to one another by different values.

In a further preferred variant of the invention, in a first run, as has just been described, an attempt is made to recognise a barcode as a whole from a single output pattern. It is only when this does not succeed with a predefined confidence— for example because the present barcode is not part of the set of expected barcodes—is the complete output pattern subdivided into the output patterns and the recognition of individual symbols carried out.

The portable apparatus comprises a camera and a data processing unit, wherein the data processing unit is programmed for carrying out the described method. For this, it preferably comprises storage means with computer program code means which are stored therein, wherein the implementation of the computer program by the data processing unit leads to the method being carried out.

The computer program for the optical detection of the linear barcode pattern and for determining a symbol sequence which is coded by the barcode pattern, may be loaded into an internal memory of a digital data processing unit and comprises computer program code means which, when they are implemented in a digital data processing unit, brings this to carry out the method according to the invention. In a preferred embodiment of the invention, a corresponding computer program product comprise as data carrier, or a computer-readable medium on which the computer program code means are stored.

Further preferred embodiments are to be deduced from the dependent patent claims. Thereby, features of the method claims, analogously, may be combined with the device claims and vice versa.

BRIEF DESCRIPTION OF THE DRAWINGS

The subject matter of the invention is explained hereinafter by way of preferred embodiment examples which are represented in the accompanying drawings. There are shown in.

The reference digits used in the drawings and their significance are listed in a grouped manner in the list of reference digits. In the figures, basically the same parts are provided with the same reference digits.

DETAILED DESCRIPTION OF THE INVENTION

One assumes a coding system of a type known per se. Depending on the context, different codes or code patterns may be assigned to a symbol, with the EAN code to a digit. For example, a digit may be coded by a certain bit sequence (such as 0111011, according to the black/white sequence in the bar code), or by the same bit sequence but backwards (1101110), or by the complementary bit sequence (1000100), or backwards and complementarily (0010001). The last two variants are known in the EAN code as the R-code and G-code.

Figure 1:
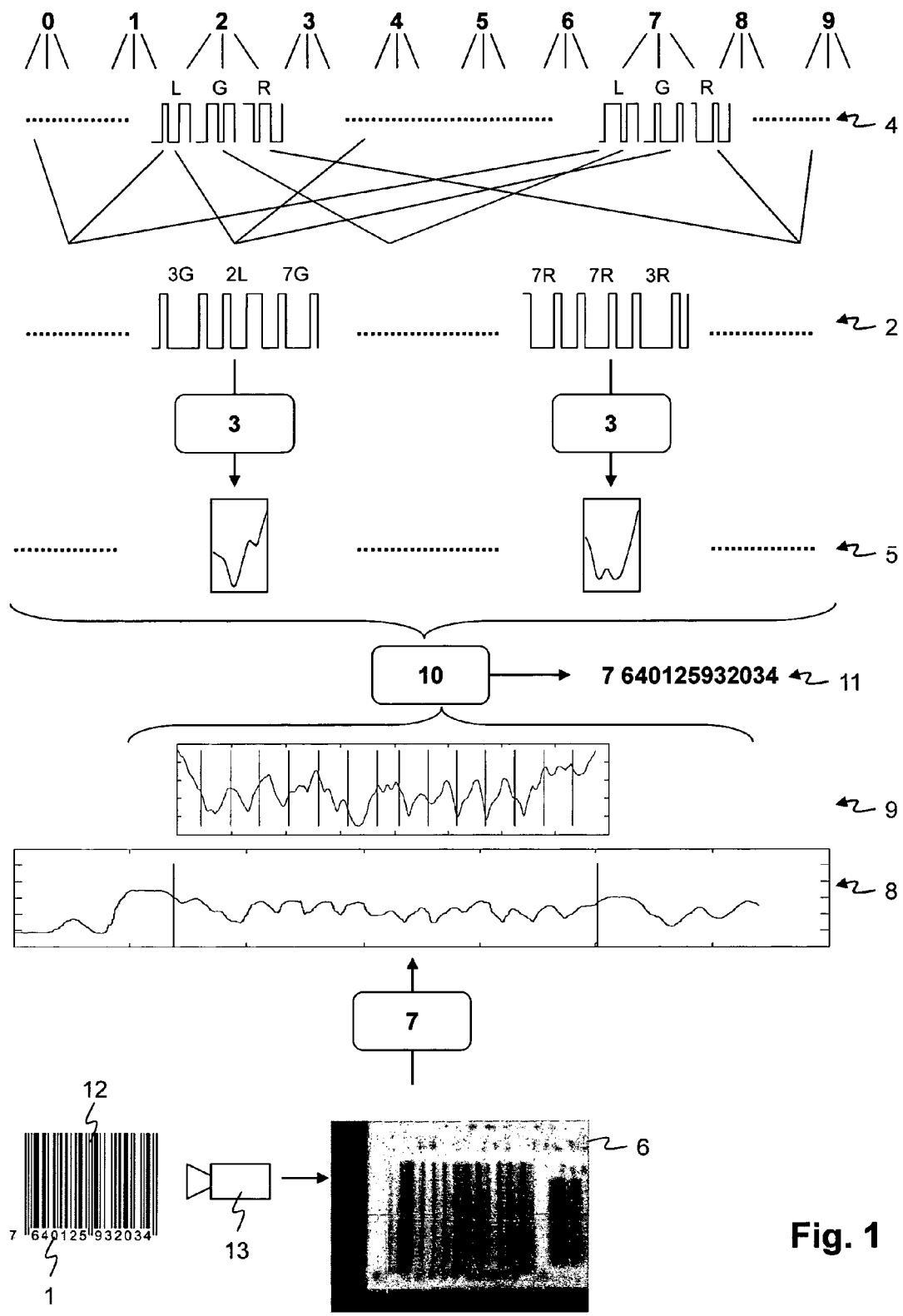
FIG. 1 the context between the processed information
FIG. 2 a blurred image of a barcode.

FIG. 1 shows the context between the information which is processed according to the invention for barcode recognition. The aim is to extract the initial symbol sequence 1 on which the barcode is based, from a blurred raw picture 6 (see also FIG. 2) of a barcode 12, created by a camera 13. A complete output pattern 8 (see also FIG. 3) is produced from the raw picture 6 by a pre-processing 7. This corresponds essentially to the brightness course along the barcode. The brightness course may be determined along an individual line perpendicular to the bars of the barcode in the raw picture 6, or by way of averaging over several such lines. With contortions and distortions of the raw picture 6, these may be compensated in a manner known per se, before the complete output pattern 8 is extracted. The Hough-transformation may for example be used for this.

Figure 3:
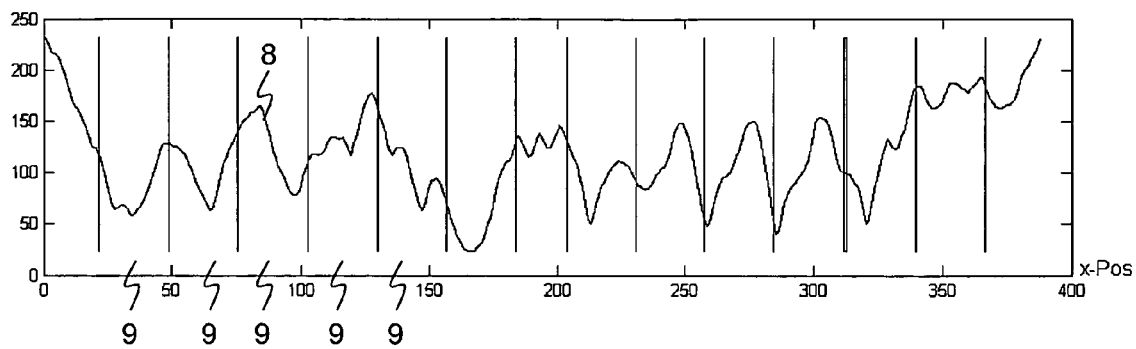
FIG. 3 a brightness course along a barcode.

The complete output pattern 8 is subdivided into individual output patterns 9 according to FIG. 3. For this, one preferably uses a-priori knowledge on the structure of the coding, for example that it is the case of an EAN-8 or EAN-13 (UPC-12) barcode, that the codes are equally wide for all symbols and consist of four alternating black and white bars, and that known start and end patterns are present.

Figure 2:
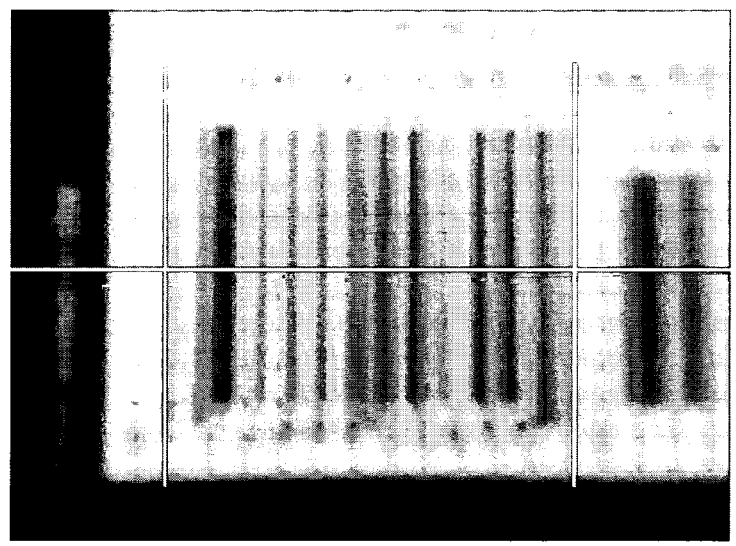

In FIG. 1, by way of example, a total output pattern 8 as a section of about 400 pixels from a brightness course with a length of approx. 650 pixels is shown between two perpendicular lines. Strung-together output patterns 9 with a total width of approx. 400 pixels are shown thereabove (the two patterns come from different recordings). The horizontal axis in each case represents the number of pixels, and the vertical axis represents the brightness. The strung-together output patterns 9, with the limits (perpendicular lines) which lie therebetween, are shown once again and enlarged in FIG. 3. A blurred recording of a barcode is shown in FIG. 2, with automatically recognised end delimitation lines (perpendicular lines) and a horizontal line, along which the brightness course is determined.

The output patterns 9 are preferably compared to reference patterns 5 in a mobile apparatus 15 in a pattern comparison 10, in order to reconstruct a recognised symbol sequence 11 which should be identical to the initial symbol sequence 1. Hereinafter, the creation of the reference pattern 5 and subsequently the pattern comparison 10 are described again with reference to FIG. 1.

At least one code pattern is assigned to each of the symbols, in the present example digits from 0 to 9 (uppermost line of FIG. 1). Here, by way of example, there are three code patterns 4 per symbol, as is known from the EAN-code. These are called the L-code, G-code and R-code. By way of example, the three code patterns 4 for the digits 2 and 7 are drawn in FIG. 1 in the second line, and the remaining code patterns 4 are indicated by dots. Only L-codes and G-codes may be present in a first digit group of the 13-digit EAN code (there are two digit groups, one to the left of a separating pattern in the middle and one to the right of this), thus as a whole twenty code patterns, and exclusively R-codes in a second digit group, thus only ten code patterns. The first and the last digits of a digit group connect to a start code or to a stop code. All combinations amid the variation of the two neighbours are formed according to the possible neighbours, for each digit. For each digit in the first digit group, this is therefore 20*20=400 (thus under the assumption that one of the neighbours of the digit is known) combinations, for each digit at the edge of the first digit group it is twenty combinations, for each digit in the second digit group it is 10*10=100 combinations and for each digit at the edge of the second digit group it is ten combinations.

Each of these combinations of code patterns 4 results in a nominal pattern 2. The multitude of nominal patterns 2 is represented, by way of example, by way of two combinations in the third line of FIG. 1. The reference patterns 5 are computed from the nominal patterns 2 by way of a simulation of the blurred optical image 3. For this, preferably a (in particular reduced to one dimension) PSF of the image 3 is used and convolved with the nominal patterns 2. The reference patterns 5 may be reduced to a section according to a symbol of interest. If, for example, the neighbouring symbol, as is shown in FIG. 1, is to be included for the simulation of the blurring, the left and the right third after the blurred image 3 may be cut away, so that the reference pattern then only contains the middle third. In this case therefore, the reference pattern 5 only represents one symbol, however with the influence of the neighbouring symbols.

In each case the nominal patterns 2 are also assigned to a triple of symbols via the assignment of the reference patterns 5 and the nominal patterns 2 to the combinations of code patterns 4, and the assignment of the code patterns 34 to the symbols. (If, in a simplified embodiment of the invention, adjacent code patterns were not to be taken into account, then exactly one symbol would be assigned to each nominal pattern 2).

The computation of the reference patterns 5 is effected preferably offline beforehand, by means of the simulation of different object distances and, as the case may be, for different camera types.

In a preferred embodiment of the invention the thus arising, as the case may be, several thousand reference patterns 5 are stored in the form of a picture file. Thereby, each reference pattern 5 is represented, for example, by a picture section with 30 picture points (pixels). In a picture of for example approx. 1056 times 421 pixels, one may thus store all reference patterns 5 for an EAN-13 code at a certain object distance. Since a picture may have three colour channels and possibly also an alpha-channel, and the reference patterns 5 are only monochromatic, one may transmit several sets of reference patterns in the form of a single picture. This has the advantage that existing methods may be used for the (loss-free) compression and for the transmission of pictures to mobile apparatus with cameras may be used.

With the pattern comparison 10, preferably in the mobile apparatus 15, now for example one proceeds in a sequential manner starting from an edge of the barcode 12 and, with the use of information on the construction of a barcode as well as information on already mentioned symbols, the search for the closest optimally fitting symbol is restricted and accelerated by way of this. Thereby, in principle, given an inconsistency of a symbol with an expected symbol, it is possible to revise the assignment of the lastly recognised symbol. Optionally, the search may also be limited by information on the symbol sequences which are permissible in the current context.

If thus, for example, in a first digit block of an EAN-code 13 corresponding to a first output pattern 9, a symbol has been identified as the digit "7", coded in the L-code, then for the subsequent output pattern 9 one either exclusively or at least firstly uses the set of 400 reference patterns 5 (i.e. compared to the output pattern 9) which belongs to the digit "7" coded in the L-code. In a preferred variant of the invention, furthermore the search is begun with those reference patterns 5 whose assigned middle symbol is equal to the expected subsequent symbol from the pattern comparison 10 of the first output pattern 9.

For the known EAN-13 code, with the recognition of the individual symbols, one thus also recognises whether the symbols are coded in each case in the L-code or in the G-code, and the first location or a further symbol of the symbol sequence 1 is decoded in the known manner according to the sequence of these coding types.

Figure 4:
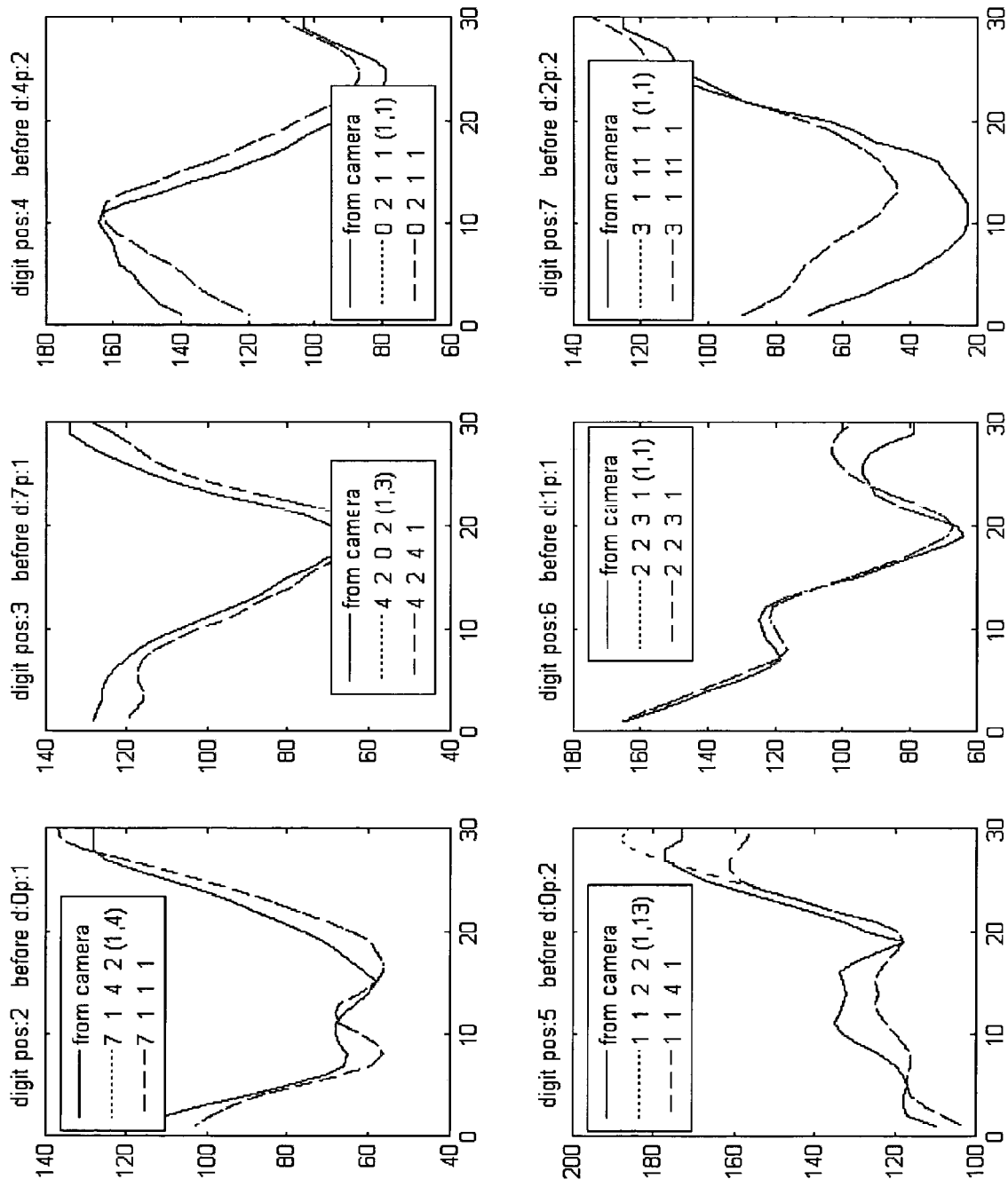
FIG. 4 exemplary output patterns and reference patterns which are identified with this.

FIG. 4 by way of example shows an output pattern 9 and reference patterns identified with this. The unbroken signal courses in each case show the output pattern 9 extracted from the camera picture. The dashed lines in each case show the reference pattern which has been assigned the output pattern 9. The dotted courses, which in almost all cases match the reference patterns, represent the correct reference pattern for comparison purposes. Six groups from a longer series of patterns are represented. Each group of patterns is about 30 pixels long and is assigned to one position of the symbol sequence. The title for a group of patterns, with "digit pos." designates the position of the symbol in the sequence, with "before d:" the previously recognised symbol the sequence and with "p:" the coding (also called "parity") of the previously recognised symbol represented by the values 1 and 2 for the L-coding or G-coding. The digits in the legend in each group of patterns or in each symbol of the sequence in each case indicate:

in the first line: the correct or ideal digit and coding of the symbol (in the first example: 7 and 1), then the correct digit and coding of the next symbol (in the first example: and 2). These values are of course only present in a test environment, in which the code sequence to be identified is known. Moreover, the second of the digits in the brackets indicates at which location of the reference patterns 5 which are sorted according to similarity with the output pattern 9, the correct reference pattern 5 is located (in the first example at the fourth location; in the third, fifth and sixth example at the first location, which thus means a prefect recognition; in the fourth example however at the thirteenth location).

in the second line: the digit and coding of the symbol recognised according to the present method (in the first example: 7 and 1), then the expected digits and coding of the next symbol (in the first example: 1 and 1, which in this case corresponds to a wrong estimation).

The comparison of the second and third line shows that the recognition of the symbols is correct for all positions in the sequence and is only partly incorrect in the estimated values for the next symbol.

Figure 5:
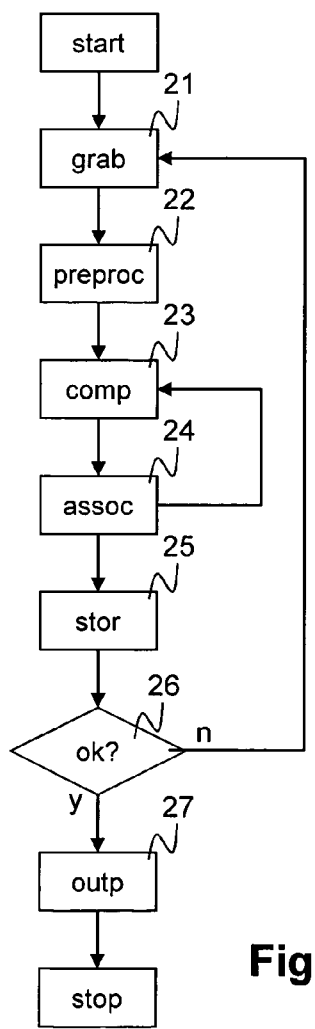
FIG. 5 a flow diagram of the method.

FIG. 5 shows a flow diagram of the method. Therein a first step 21 "grab" indicates the taking of a raw picture 6 by way of the camera 13;

a second step 22 "preproc" the pre-processing 7 of the raw picture 6 for the production of the sequence of output patterns 9;

a third step 23 "comp" the comparison 10 of the output patterns 9 with stored reference patterns 5;

a fourth step "assoc" the determining of the optimally assigned reference pattern 5, for each of the output patterns 9;

a fifth step 25 "stor" the outputting, transmitting or storing of the symbols which correspond to the determined reference patterns 5.

The third and the fourth steps 23, 24 may be iteratively repeated if the output patterns 9 are processed after one another. For cases, in which the first to fifth steps are carried out repeatedly until a predefined abort criterion is fulfilled, in the fifth step in each case the result of a run is stored, and a further step 26 "ok?" is subsequently carried out for the control of the abort criterion. If the abort criterion is fulfilled (y), the result is outputted, stored or transmitted in an output step 27 "outp", and the method is subsequently finished. Otherwise (n) the steps are repeated with a new recording of the raw picture 6.

Figure 6:
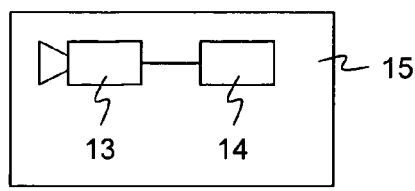
FIG. 6 a mobile apparatus.

FIG. 6 schematically shows a mobile apparatus 15 with a camera 13 and with a data processing unit 14. The data processing unit 14 is programmed to carry out the recognition, proceeding on the one hand from the stored reference patterns 5 and on the other hand from one or a sequence of raw pictures 6.

LIST OF REFERENCE DIGITS symbol sequence
nominal pattern
blurred image
code pattern
reference pattern
raw picture
pre-processing
total output pattern
output pattern
pattern comparison
recognised symbol sequence
barcode
camera
data processing unit
mobile apparatus

The invention claimed is:

1. A method for the optical detection of a linear barcode pattern and for determining a symbol sequence which is coded by the linear barcode pattern, wherein the method proceeds from a blurred raw picture and comprises the following steps:
   taking a raw picture of the linear barcode pattern;
   pre-processing the raw picture of the linear barcode pattern for producing a single output linear barcode pattern or a sequence of output linear barcode patterns, wherein each output linear barcode pattern corresponds to a brightness course along the linear barcode pattern and division of the complete output linear barcode pattern into sequence of output linear barcode patterns;
   comparing the output linear barcode patterns or the single output linear barcode pattern with stored reference linear barcode patterns of linear barcode patterns, wherein the reference linear barcode patterns in each case correspond to a brightness course and division of the complete output linear barcode pattern into sequence of output linear barcode patterns of blurred images of non-blurred nominal linear barcode patterns, and at least one symbol is assigned to each reference linear barcode pattern;
   determining, for the single output linear barcode pattern or for each of the sequence of output linear barcode patterns, in each case the reference linear barcode pattern which has the greatest similarity to the output linear barcode pattern;
   outputting, transmitting or storing the symbols which correspond to the determined linear barcode reference patterns, according to the single output linear barcode pattern or the sequence of output linear barcode patterns, as a symbol sequence.

2. The method according to claim 1, wherein the step of pre-processing comprises at least the step:

producing a brightness course along the linear barcode pattern by way of selection of a picture of the raw picture or by way of averaging over several picture lines of the raw picture.

3. The method of according to claim 1, wherein the step of the pre-processing comprises at least the step:
   producing the brightness course along the linear barcode pattern by way of carrying out a Hough transformation on the raw picture or a section of the raw picture, by which means a frequency distribution arises in an imaging plane spanned by angle and distance, and extraction of the brightness course according to the sequence of values on a straight line in the imaging plane, which leads through the maxima in the imaging plane and corresponds to a constant angle.

4. The method according to claim 1, wherein several stored reference linear barcode patterns in each case for different imaging parameters are present for each of the nominal linear barcode patterns; and with the comparison of the output linear barcode patterns with stored reference linear barcode patterns, one uses a set of those reference linear barcode patterns which corresponds to an estimation of these imaging parameters.

5. The method according to claim 4, wherein the different imaging parameters correspond to different object distances.

6. The method according to claim 5, wherein an estimation of the object distance or a selection of the applied set of reference linear barcode patterns is effected by way of a measure for the blurredness of the raw picture.

7. The method according to claim 6, wherein the measure for the blurredness of the raw picture is a maximum of the brightness gradient at black-white transitions in the raw picture or in the output linear barcode patterns.

8. The method according to claim 1, wherein the reference linear barcode patterns in each case are assigned to a reference symbol and to at least one neighbouring symbol, and wherein with the comparison of a sequence of output linear barcode patterns with the reference linear barcode patterns, not only is a correct assignment of an output linear barcode pattern to a reference linear barcode pattern and thus also to a reference symbol required, but also at least one neighbouring symbol must agree with the reference symbol corresponding to a neighbouring output linear barcode pattern.

9. The method according to claim 7, wherein with the comparison of a sequence of output linear barcode patterns, after a first output linear barcode pattern has been assigned to a reference symbol, for a neighbouring output linear barcode pattern, the set of the reference linear barcode patterns which are available for selection is limited to those reference linear barcode patterns, whose assigned neighbouring symbol is equal to the reference symbol corresponding to the first output linear barcode pattern.

10. The method according to claim 1, wherein the steps from taking the raw picture to determining the recognised symbol sequence is repeated several times until a predefined number of results agree with one another.

11. The method according to claim 1, further comprising the step that symbol sequences to be recognised and corresponding reference linear barcode patterns, at a sales location, are transmitted in a wireless manner to a portable apparatus, and the portable apparatus carries out the method according to one of the preceding steps.

12. A portable apparatus for the optical detection of a linear barcode pattern and for determining a symbol sequence which is coded by the linear barcode pattern, comprising a camera and a data processing unit, wherein the data processing unit is programmed for carrying out the method according to claim 1.

13. A non-transitory machine readable medium encoded with program code that causes a data processing unit to carry out the method for the optical detection of a linear barcode pattern and for determining a symbol sequence, which is coded by the barcode pattern, according to claim 1.

* * * * *